United States Patent Office 3,069,458
Patented Dec. 18, 1962

3,069,458
THERMAL CRACKING OF α,β-DICHLORO-
PROPIONITRILE
Glenn C. Morrison, Newfoundland, N.J., and Wesley O. Fugate, Stepney Depot, Conn., assignors to American Cyanamid Company, New York, N.Y., a corporation of Maine
No Drawing. Filed Jan. 7, 1960, Ser. No. 959
2 Claims. (Cl. 260—465.7)

The present invention relates to β-chloroacrylonitrile. More particularly, this invention relates to a novel method for the preparation of β-chloroacrylonitrile.

It is known that β-chloroacrylonitrile or 2-chlorovinyl cyanide (Cl—CH=CH—CN) may possibly be obtained as a by-product of the catalytic vapor phase chlorination of acrylonitrile at temperatures between about 200° C. and 550° C. However, since the principal product, α-chloroacrylonitrile or 1-chlorovinyl cyanide is only produced in an amount of about 40% based upon the reacted acrylonitrile the process does not afford too suitable a method for the preparation of β-chloroacrylonitrile.

Another method which has been employed for the preparation of β-chloroacrylonitrile involves the reaction of acetylene with cyanogen chloride. The use of certain catalysts such as cuprous chloride and alkali and alkaline-earth metal cyanides is preferred in such a method in order to obtain somewhat better yields than those resulting merely from the reaction of cyanogen chloride and acetylene in an inert solvent such as hexane.

In any event, however, neither known method for the production of β-chloroacrylonitrile may be considered to be especially advantageous since the former method, at best, affords only small yields of β-chloroacrylonitrile while the latter process, although an improvement to some degree over the former, nonetheless provides low yields and conversions.

In view of the disadvantages of the methods of the prior art, the need has long existed for a simple process for the preparation of β-chloroacrylonitrile. The desirability of such a process has become more significant since β-chloroacrylonitrile is particularly useful in the formation of resinous and rubber like copolymers with 1,3-butadiene, acrylonitrile, styrene and other like ethylenically unsaturated compounds. Moreover, β-chloroacrylonitrile may be readily hydrolyzed in a conventional procedure to produce β-chloroacrylic acid and may be hydrogenated to yield β-chloropropionitrile which in turn may be dehydrochlorinated to acrylonitrile. Additional uses for β-chloroacrylonitrile will also be readily apparent to those skilled in the art.

It has now been discovered that β-chloroacrylonitrile may be readily prepared in excellent yield by thermally cracking α,β-dichloropropionitrile at certain preferred temperature conditions. In accordance with the present invention, α,β-dichloropropionitrile, which is obtained as a reaction product of acrylonitrile and chlorine, is subjected to temperatures in excess of 475° C. for a minimum period of actual contact time. The resultant β-chloroacrylonitrile is then easily distilled or otherwise separated from the crude reaction mixture. As a result of our simple expeditious process β-chloroacrylonitrile is obtained in markedly improved yield as compared with that of prior art processes and is substantially free of contaminating by-products resulting from the pyrolysis procedure.

The temperature at which α,β-dichloropropionitrile is pyrolyzed is critical only insofar as it should be at least 475° C. Below 475° C., only relatively small amounts of β-chloroacrylonitrile are produced. However, at thermal cracking temperatures above 475° C. surprisingly α,β-dichloropropionitrile readily is dehydrochlorinated to yield amounts of from about 30 to about 65% of β-chloroacrylonitrile, based upon the weight of α,β-dichloropropionitrile starting material. In general, cracking temperatures of from about 475° C. to about 700° C. are satisfactory and no particular advantage is apparently seen to be derived from employing temperatures above about 700° C. Preferably, however, pyrolysis temperatures of from about 550° C. to about 650° C. are employed for optimum yield. While the thermal cracking of α,β-dichloropropionitrile may be accomplished merely by subjecting the same to temperatures in excess of about 475° C. it is also within the scope of this invention to employ a catalyst, e.g., one of the weakly acidic or neutral absorbent types, in the process but the use of such catalysts is not absolutely necessary since the present pyrolysis procedure affords high yields of β-chloroacrylonitrile even without the use of catalytic masses.

The thermal cracking or pyrolysis may be carried out in any suitable pyrolytic reaction apparatus which will afford proper temperature control, for example, in a heated tube. Such a heated tube may be constructed of thermally resistant glass, quartz or the like. Prolonged preheating of the starting material, α,β-dichloropropionitrile should be avoided. Otherwise, substantial amounts of α-chloroacrylonitrile may be obtained. It is generally desirable to vent the hydrogen chloride liberated from the cracked α,β-dichloropropionitrile since if it is allowed to remain in contact with the β-chloroacrylonitrile it may possibly cause regeneration of α,β-dichloropropionitrile. Collection of the products may be accomplished by any convenient and desirable means, e.g., a series of ice traps and/or suitable solvent vessels. It may sometimes be necessary to add an inhibitor or mild neutralizing agent to the product collection trap in order to forestall or retard polymerization of the products or regeneration of α,β-dichloropropionitrile. The crude reaction mixture may be readily separated, e.g., by fractional distillation, to yield the desired β-chloroacrylonitrile. Both α-chloroacrylonitrile which is also obtained and may be recombined with hydrogen chloride to form α,β-dichloropropionitrile and unreacted α,β-dichloropropionitrile may be subsequently recycled through the reactor.

The starting material, α,β-dichloropropionitrile, is readily prepared by reaction of chlorine and acrylonitrile preferably in the presence of a solvent such a pyridine at temperatures of from about 10° to about 50° C. Of course, other methods for the preparation of α,β-dichloropropionitrile are well known and these include the reactions of chlorine and acrylonitrile at room temperature in the presence of light both in the presence of and in the absence of a solvent.

Examples of preferred methods of practicing our invention are set forth hereinafter but it is to be understood that the examples are merely illustrative and are not to be construed as limiting the scope of this invention.

*Example 1*

Into a borosilicate glass tube (42 mm. x 40 cm.) maintained at a temperature of 605° C. is fed 3880 grams of α,β-dichloropropionitrile at the rate of 130 grams/hour. The liquid products are collected in a trap at 25° C. and the gaseous materials such as hydrogen chloride are vented to the atmosphere. Vapor phase chromatographic analysis shows the ratio of materials in the crude product to be: β-chloroacrylonitrile: 63; α-chloroacrylonitrile: 31; α-β-dichloropropionitrile: 5. The ratio of β-chloroacrylonitrile to α-chloroacrylonitrile is thus 2.0/1.0. On distillation there is isolated 920 grams (33%) β-chloroacrylonitrile B.P. 117–144° C. and 405 grams (15%) of α-chloroacrylonitrile B.P. 87–90° C.

The procedure of Example I is followed and results obtained in the various runs wherein different conditions are employed appear in the following table:

| Example | α,β-Dichloropropionitrile feed | | | | | Vapor phase chromatographic analysis of crude product | | | Ratio of β-chloroacrylonitrile to α-chloroacrylonitrile in product |
|---|---|---|---|---|---|---|---|---|---|
| | Size of reactor | Grams | Reactor temp., ° C. | Rate of feed, grams/hour | Contact time, Secs. | β-Chloroacrylonitrile | α-Chloroacrylonitrile | α,β-Dichloropropionitrile | |
| 2 | 28 mm.×30 cm | 75 | 400 | 27 | 15 | 21 | 27 | 44 | .8/1.0 |
| 3 | do | 75 | 465 | 8 | 42 | 30 | 32 | 37 | .9/1.0 |
| 4 | do | 75 | 495 | 8 | 44 | 52 | 39 | 9 | 1.3/1.0 |
| 5 | do | 75 | 525 | 8 | 46 | 56 | 38 | 7 | 1.5/1.0 |
| 6 | do | 75 | 555 | 13 | 30 | 59 | 37 | 4 | 1.6/1.0 |
| 7 | 42 mm.×40 cm | 400 | 575 | 130 | 21 | 60 | 33 | 7 | 1.8/1.0 |
| 8 | do | 400 | 590 | 160 | 17 | 64 | 32 | 5 | 2.0/1.0 |
| 9 | do | 400 | 600 | 130 | 21 | 60 | 34 | 3 | 1.8/1.0 |
| 10 | do | 400 | 620 | 195 | 20 | 62 | 35 | 3 | 1.8/1.0 |

From the results appearing in the examples hereinabove it will be observed that when the pyrolysis of α,β-dichloropropionitrile is conducted within the preferred critical temperature ranges, the ratio of β-chloroacrylonitrile to α-chloroacrylonitrile varies from about 1.3 to about 2.0 of the β-compound to 1.0 of the α-compound. Below temperatures of about 475° C., however, α-chloroacrylonitrile is preferentially obtained. Thus, the thermal cracking of α,β-dichloropropionitrile affords an easy method for production of β-chloroacrylonitrile in yields hitherto not considered possible.

We claim:
1. A method for preparing β-chloroacrylonitrile which consists essentially of thermally crackling α,β-dichloropropionitrile at a temperature in excess of about 475° C. and recovering β-chloroacrylonitrile.

2. A method for preparing β-chloroacrylonitrile which consists essentially of heating α,β-dichloropropionitrile to a temperature within the range of from about 475° C. to about 700° C., condensing the products obtained thereby and fractionating said products to separate β-chloroacrylonitrile.

References Cited in the file of this patent
UNITED STATES PATENTS

| | | |
|---|---|---|
| 2,231,363 | Long | Feb. 11, 1941 |
| 2,298,739 | Lichty et al. | Oct. 13, 1942 |
| 2,437,998 | Clifford et al. | Mar. 16, 1948 |

OTHER REFERENCES

Brintzinger et al.: Angew. Chem., A60, pages 311–321 (1948).